(12) United States Patent
Choi et al.

(10) Patent No.: US 12,544,479 B2
(45) Date of Patent: Feb. 10, 2026

(54) SELF-WETTING TRIPHASE PHOTOCATALYTIC COMPOSITE, METHOD OF PREPARING SAME, AND AIR PURIFICATION METHOD USING SAME

(71) Applicant: POSTECH Research and Business Development Foundation, Pohang-si (KR)

(72) Inventors: Wonyong Choi, Pohang-si (KR); Fei He, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 1141 days.

(21) Appl. No.: 17/462,242

(22) Filed: Aug. 31, 2021

(65) Prior Publication Data
US 2023/0014247 A1 Jan. 19, 2023

(30) Foreign Application Priority Data
Jul. 1, 2021 (KR) .................. 10-2021-0086346

(51) Int. Cl.
*A61L 9/20* (2006.01)
*B01D 53/00* (2006.01)
(Continued)

(52) U.S. Cl.
CPC ............ *A61L 9/205* (2013.01); *B01D 53/007* (2013.01); *B01D 53/8668* (2013.01); *B01J 27/06* (2013.01); *B01J 27/132* (2013.01); *B01J 27/135* (2013.01); *B01J 35/39* (2024.01); *B01J 37/04* (2013.01); *B01D 2255/20776* (2013.01); *B01D 2255/802* (2013.01); *B01D 2257/708* (2013.01); *B01D 2259/802* (2013.01)

(58) Field of Classification Search
CPC ... A61L 9/205; A61L 2209/22; B01D 53/007; B01D 53/8668; B01D 2255/20776; B01D 2255/802; B01D 2257/708; B01D 2259/802; B01D 53/885; B01D 2255/1021; B01D 2255/20707; B01D 2255/20723; B01D 2255/70; B01D 2258/06; B01J 27/06; B01J 27/132; B01J 27/135; B01J 35/39; B01J 37/04; B01J 37/0215

See application file for complete search history.

(56) References Cited

FOREIGN PATENT DOCUMENTS

| KR | 2020-0134546 | | 12/2020 | |
|---|---|---|---|---|
| PL | 233343 | B1 * | 9/2019 | |
| WO | WO-0224332 | A1 * | 3/2002 | ............ B01J 35/002 |

OTHER PUBLICATIONS

Gang Liu et al., "Iodine doped anatase TiO2 photocatalyst with ultra-long visible light response: correlation between geometric/electronic structures and mechanisms", J. Mater. Chem, 2009, 19, 2822-2829 (Mar. 11, 2009).

(Continued)

*Primary Examiner* — Brendan A Hensel
(74) *Attorney, Agent, or Firm* — LEX IP MEISTER, PLLC (57) ABSTRACT

Proposed is a photocatalytic complex. The photocatalytic complex includes a photocatalyst, and an iodine compound layer formed on a surface of the photocatalyst to cover the same and containing an iodine compound. The present disclosure enables selective degradation of hydrophilic volatile organic compounds by the use of the photocatalyst coated with the iodine compound.

9 Claims, 10 Drawing Sheets

(51) Int. Cl.
*B01D 53/86* (2006.01)
*B01J 27/06* (2006.01)
*B01J 27/132* (2006.01)
*B01J 27/135* (2006.01)
*B01J 35/39* (2024.01)
*B01J 37/04* (2006.01)

(56) References Cited

OTHER PUBLICATIONS

KIPO, Office Action of KR 10-2021-0086346, dated Dec. 1, 2022, total 10 pages.

* cited by examiner

SELF-WETTING TRIPHASE PHOTOCATALYTIC COMPOSITE, METHOD OF PREPARING SAME, AND AIR PURIFICATION METHOD USING SAME

CROSS REFERENCE TO RELATED APPLICATION

The present application claims priority to Korean Patent Application No. 10-2021-0086346, filed on Jul. 1, 2021, the entire contents of which is incorporated herein for all purposes by this reference.

BACKGROUND OF THE INVENTION

Field of the Invention

The present disclosure relates generally to a photocatalytic complex, a method of preparing the same, and an air purification method using the same. More particularly, the present disclosure relates to a photocatalytic complex that includes a photocatalyst coated with an iodine compound, thereby selectively photodegrading hydrophilic volatile organic compounds. In addition, the present disclosure relates to a method of preparing the same photocatalytic complex and an air purification method using the same.

Description of the Related Art

Volatile organic compounds (VOCs), such as alcohols, ketones, aldehydes, aromatics, etc., are major components of air pollution, which significantly deteriorates air quality and seriously affect human health. Current air purification technologies are based on adsorption, but these methods are not suitable for practical air purification of indoor air in which air pollutants of low concentration spread. Air purification technologies based on ionization, ultraviolet sterilization, and plasma are not suitable because they generate ozone as a by-product, which adversely affects human health, causing secondary pollution. Additionally, catalytic combustion of VOCs requires high temperature and high energy for the activation of VOCs. On the other hand, photocatalysis is widely considered as a promising future technology for removing indoor air pollutants because of its ability to fully degrade various VOCs into harmless carbon dioxide ($CO_2$) and water ($H_2O$) in the presence of light under ambient temperature and pressure conditions.

When irradiated with light, a photocatalyst is activated while absorbing photons with energy equal to or greater than the band gap of the photocatalyst. When the photocatalyst absorbs the photons with the energy equal to or greater than the band gap energy, electrons are excited from a valence band (VB) into a conduction band (CB), leaving holes in the valence band (VB). The electrons react with oxygen to generate superoxide radicals, whereas the holes oxidize water to hydroxyl radicals (·OH). The resulting reactive oxygen species fully degrade gas pollutants adsorbed on the catalyst into carbon dioxide ($CO_2$) and water ($H_2O$).

It is known that UV light accounts for only about 5% of the solar energy, while visible light accounts for about 43%. In particular, considering that there are far fewer UV photons in an enclosed indoor space where air quality needs to be controlled, the development of photocatalysts that efficiently utilize visible light is essentially needed. However, the performance of visible-light-driven photocatalysts is much lower than UV photocatalysts and needs significant improvements to satisfy the requirements for practical air purification.

In typical photocatalytic mechanisms, most electrons and holes recombine before reaching the photocatalyst surface, and only a very small portion of charge carriers finally reach the photocatalyst surface and participate in the degradation of VOCs. The most commonly used method to overcome this shortcoming is to employ platinum nanoparticles as a co-catalyst which reduces oxygen ($O_2$) to hydrogen peroxide ($H_2O_2$) or water ($H_2O$) at the CB edge potential of the photocatalyst to facilitate charge separation and subsequently OH radical production. However, the use of expensive Pt co-catalyst limits its practical applications, which requires more cost-effective method utilizing cheaper materials.

Furthermore, current air purification systems based on photocatalysts are diphase (gas-solid) systems in which photogenerated holes react with water molecules adsorbed on the catalyst surface to produce ·OH. Since this photocatalytic reaction mainly occurs only at the gas-solid interface, both water and VOCs molecules need to migrate to the catalyst surface to initiate the reaction. Therefore, there is a need for research to efficiently proceed the photocatalytic reaction.

SUMMARY OF THE INVENTION

Accordingly, the present disclosure has been made keeping in mind the above problems occurring in the related art, and an objective of the present disclosure is to provide a photocatalytic complex that includes a photocatalyst coated with an iodine compound, thereby selectively photodegrading hydrophilic volatile organic compounds, a method of preparing the same, and an air purification method using the same.

Another objective of the present disclosure is to provide a photocatalytic complex for photodegrading volatile organic compounds under visible light irradiation, a method of preparing the same, and an air purification method using the same.

Still another objective of the present disclosure is to provide a photocatalytic complex for realizing a triphase (gas-liquid-solid) photocatalysis system by formation of a water layer resulting from self-wetting of an iodine compound, a method of preparing the same, and an air purification method using the same.

Still another objective of the present disclosure is to provide a photocatalytic complex that is inexpensive, simple, and highly efficient compared to the related art, a method of preparing the same, and an air purification method using the same.

In order to achieve the above objectives, according to one aspect of the present disclosure, there is provided a photocatalytic complex including: a photocatalyst; and an iodine compound layer formed on a surface of the photocatalyst to cover the same and containing an iodine compound.

The photocatalytic complex may further include a water layer, wherein the water layer may be formed on a surface of the photocatalytic complex to cover the same, and contains a first water.

The water layer may be formed by self-wetting of the iodine compound.

The iodine compound may include at least one selected from the group consisting of periodic acid ($HIO_4$), periodic acid hydrate ($HIO_4 \cdot 2H_2O$), iodic acid ($HIO_3$), sodium periodate ($NaIO_4$), sodium iodate ($NaIO_3$), and sodium iodide (NaI).

The iodine compound may include at least one selected from the group consisting of periodic acid ($HIO_4$) and periodic acid hydrate ($HIO_4 \cdot 2H_2O$).

The photocatalyst may include at least one selected from the group consisting of tungsten trioxide ($WO_3$), bismuth vanadate ($BiVO_4$), titanium dioxide ($TiO_2$), and nitrogen (N)-doped titanium dioxide ($N—TiO_2$).

The photocatalyst may include tungsten trioxide ($WO_3$).

A cation of the photocatalyst may bind with an oxygen atom (O) of the iodine compound.

The photocatalytic complex may degrade a volatile organic compound.

The volatile organic compound may include at least one selected from the group consisting of formaldehyde (FA), acetaldehyde (AA), methanol (MeOH), isopropanol (IPA), acetone (AT), dichloromethane (DCM), n-pentane (C5), n-chloropropane (ClC3), and toluene (Tol).

The photocatalytic complex may perform catalytic reactions among gas, liquid, solid phases, wherein the gas phase may include the volatile organic compound, the liquid phase may include the first water, and the solid phase may include the photocatalyst and the iodine compound layer.

According to another aspect of the present disclosure, there is provided a photocatalytic system including: a substrate; and a photocatalytic complex layer formed on the substrate and including a plurality of photocatalytic complexes, wherein each of the photocatalytic complexes may include: a photocatalyst; and an iodine compound layer formed on a surface of the photocatalyst to cover the same and containing an iodine compound.

The photocatalytic system may further include a second water disposed between each of the photocatalytic complexes.

According to still another aspect of the present disclosure, there is provided a method of preparing a photocatalytic complex, the method including: (a) preparing a mixed solution containing a photocatalyst and an iodine compound; and (b) stirring the mixed solution to prepare the photocatalytic complex that includes the photocatalyst and an iodine compound layer formed on a surface of the photocatalyst to cover the same and containing the iodine compound.

The method may further include, after step (b), (c) forming a water layer by self-wetting of the iodine compound, the water layer being formed on the surface of the photocatalytic complex to cover the same and containing a first water.

According to still another aspect of the present disclosure, there is provided an air purification method including photodegrading a volatile organic compound by bringing a photocatalytic complex into contact with air containing the volatile organic compound under light irradiation, wherein the photocatalytic complex may include: a photocatalyst; and an iodine compound layer formed on a surface of the photocatalyst to cover the same and containing an iodine compound.

The photocatalytic complex may further include a water layer, wherein the water layer may be formed on a surface of the photocatalytic complex to cover the same and may contain a first water.

The air purification method may include: (1) bringing the photocatalytic complex into contact with the air containing the volatile organic compound under light irradiation; (2) dissolving a hydrophilic volatile organic compound contained in the volatile organic compound in the water layer; and (3) degrading the hydrophilic volatile organic compound dissolved in the water layer using the photocatalytic complex as a catalyst.

The light irradiation may be carried out with light including a visible light region.

The air may further include a hydrophobic volatile organic compound, and the photocatalytic complex may selectively degrade the hydrophilic volatile organic compound selected from the hydrophilic volatile organic compound and the hydrophobic volatile organic compound.

The photocatalytic complex, the method of preparing the same, and the air purification method using the same according to the present disclosure enable selective degradation of hydrophilic volatile organic compounds by the use of the photocatalyst coated with the iodine compound.

Furthermore, the present disclosure enables degradation of volatile organic compounds under visible light irradiation.

Furthermore, the present disclosure realizes a triphase (gas-liquid-solid) photocatalysis system by formation of a water layer resulting from self-wetting of an iodine compound.

Furthermore, the present disclosure is inexpensive, simple, and highly efficient compared to the related art.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings such that the disclosure can be easily embodied by one of ordinary skill in the art to which this disclosure belongs.

However, the following description is not intended to limit the present disclosure to those exemplary embodiments. Further, when it is determined that the detailed description of the known art related to the present disclosure might obscure the gist of the present disclosure, the detailed description thereof will be omitted.

The terminology used herein is for the purpose of describing particular embodiments only and is not intended to be limiting of the present disclosure. As used herein, the singular forms are intended to include the plural forms as well, unless the context clearly indicates otherwise. It will be understood that the terms "comprises" or "have" used in this specification, specify the presence of stated features, processes, operations, components, parts, or a combination thereof, but do not preclude the presence or addition of one or more other features, numerals, processes, operations, components, parts, or a combination thereof.

First, a photocatalytic composite according to the present disclosure will be described.

An aspect of the present disclosure provides a photocatalytic complex including a photocatalyst, and an iodine compound layer formed on a surface of the photocatalyst to cover the same and containing an iodine compound.

The photocatalytic complex may further include a water layer. The water layer may be formed on a surface of the photocatalytic complex to cover the same and may contain a first water.

The water layer may be formed by self-wetting of the iodine compound.

The iodine compound may include at least one selected from the group consisting of periodic acid (HIO$_4$), periodic acid hydrate (HIO$_4$·2H$_2$O), iodic acid (HIO$_3$), sodium periodate (NaIO$_4$), sodium iodate (NaIO$_3$), and sodium iodide (NaI), and preferably at least one selected from the group consisting of periodic acid (HIO$_4$) and periodic acid hydrate (HIO$_4$·2H$_2$O).

The photocatalyst may include at least one selected from the group consisting of tungsten trioxide (WO$_3$), bismuth vanadate (BiVO$_4$), titanium dioxide (TiO$_2$), and nitrogen (N)-doped titanium dioxide (N—TiO$_2$), and preferably tungsten trioxide (WO$_3$).

A cation of the photocatalyst may bind with an oxygen atom (O) of the iodine compound. Specifically, in the photocatalytic complex according to the present disclosure, a W cation on a surface of a photocatalyst (WO$_3$) may bind with an oxygen atom in PA molecule in the form of "W—O—I—(OH)$_n$".

The photocatalytic complex may degrade a volatile organic compound (VOC).

The photocatalytic complex may selectively degrade a hydrophilic volatile organic compound contained in the volatile organic compound.

The volatile organic compound may include at least one selected from the group consisting of formaldehyde (FA), acetaldehyde (AA), methanol (MeOH), isopropanol (IPA), acetone (AT), dichloromethane (DCM), n-pentane (C5), n-chloropropane (ClC3), and toluene (Tol).

The hydrophilic volatile organic compound may include at least one selected from the group consisting of formaldehyde (FA), acetaldehyde (AA), methanol (MeOH), isopropanol (IPA), and acetone (AT).

The photocatalytic complex may perform catalytic reactions among gas, liquid, and solid phases. The gas phase may include the volatile organic compound, the liquid phase may include the first water, and the solid phase may include the photocatalyst and the iodine compound layer.

Another aspect of the present disclosure provides a photocatalytic system. The photocatalytic system includes a substrate, and a photocatalytic complex layer formed on the substrate and including a plurality of photocatalytic complexes. Each of the photocatalytic complexes includes a photocatalyst, and an iodine compound layer formed on a surface of the photocatalyst to cover the same and containing an iodine compound.

The photocatalytic system may further include a second water disposed between each of the photocatalytic complexes.

Another aspect of the present disclosure provides a method of preparing a photocatalytic complex. The method includes the steps of: (a) preparing a mixed solution containing a photocatalyst and an iodine compound; and (b) stirring the mixed solution to prepare the photocatalytic complex that includes the photocatalyst and an iodine compound layer formed on a surface of the photocatalyst to cover the same and containing the iodine compound.

Step (a) may include the steps of (a-1) preparing a solution containing the iodine compound; and (a-2) preparing the mixed solution by adding the photocatalyst to the solution and then performing ultrasonic treatment.

In step (a-1), the solution may have a concentration of 0.03 to 0.18 mol/L.

The method may further include, after step (b), the step of (c) forming a water layer by self-wetting of the iodine compound, the water layer being formed on the surface of the photocatalytic complex to cover the same and containing a first water.

Figure 1:
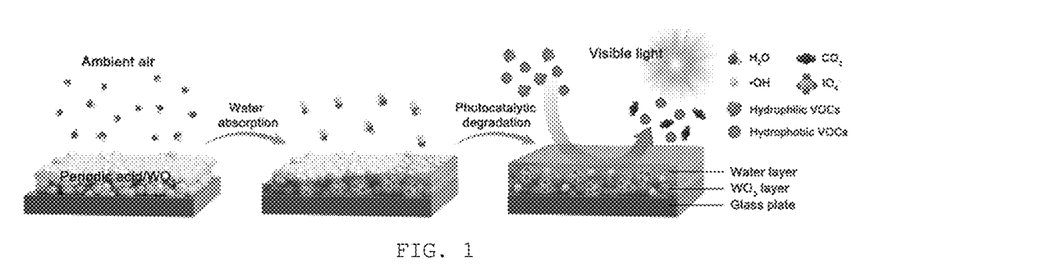
FIG. 1 is a view illustrating a working mechanism of a photocatalytic complex according to the present disclosure.

FIG. 1 is a view illustrating a working mechanism of a photocatalytic complex according to the present disclosure. Hereinafter, an air purification method will be described with reference to FIG. 1.

Another aspect of the present disclosure provides an air purification method. The air purification method includes photodegrading a volatile organic compound by contact of a photocatalytic complex with air containing the volatile organic compound under light irradiation. The photocatalytic complex includes: a photocatalyst; and an iodine compound layer formed on a surface of the photocatalyst to cover the same and containing an iodine compound.

The photocatalytic complex may further include a water layer. The water layer may be formed on a surface of the photocatalytic complex to cover the same and may contain a first water.

The water layer may be formed by self-wetting of the iodine compound.

The air purification method may include the steps of (1) bringing the photocatalytic complex into contact with the air containing the volatile organic compound under light irradiation; (2) dissolving a hydrophilic volatile organic compound contained in the volatile organic compound in the water layer; and (3) degrading the hydrophilic volatile organic compound dissolved in the water layer using the photocatalytic complex as a catalyst.

The light irradiation may be carried out with light including a visible light region, and the visible light may have a wavelength of 400 to 480 nm.

The air may further include a hydrophobic volatile organic compound, and the photocatalytic complex may selectively degrade the hydrophilic volatile organic compound selected from the hydrophilic volatile organic compound and the hydrophobic volatile organic compound.

Referring to FIG. 1, when periodic acid (PA) as a highly hygroscopic substance is introduced in the photocatalyst, a thin water layer is formed on the surface of the photocatalyst by absorbing moisture from the surrounding air. The presence of thin water layer solubilizes and concentrates hydrophilic VOCs therein, and the highly oxidizing PA serves as a strong scavenger of CB electrons, favoring the separation of photogenerated electron-hole pairs. As a result, this enhances the generation of ·OH via hole transfer, thereby promoting photocatalytic reaction and degradation of VOCs. However, hydrophobic VOCs are little degraded by the photocatalytic composite (PA/WO$_3$) due to poor solubility thereof in the water layer. This enables the photocatalytic complex (PA/WO$_3$) to selectively degrade hydrophilic VOCs among VOCs in the atmosphere.

The photocatalytic mechanism using the photocatalytic complex according to the present disclosure is proposed as follows in [Equation 1] below.

$$WO_3 + h\nu \rightarrow h_{vb}^+ + e_{cb}^-$$

$$HIO_4(PA) \rightarrow H^+ + IO_4^- \text{ (in in-situ water layer)}$$

$$IO_4^- + 2H^+ + 2e_{cb}^- \rightarrow IO_3 + H_2O$$

$$H_2O + h^+ \rightarrow \cdot OH + H^+$$

$$AA \text{ (acetaldehyde)} + \cdot OH + O_2 \rightarrow \rightarrow CO_2 \qquad \text{[Equation 1]}$$

EXAMPLE

Hereinafter, examples of the present disclosure will be described. However, these examples are for illustrative purposes, and the scope of the present disclosure is not limited thereby.

The materials used in the examples are as follows: Tungsten oxide (WO$_3$, nanopowder, Sigma-Aldrich), titanium dioxide (TiO$_2$, P25, nanopowder, Evonik), bismuth vanadate (BiVO$_4$, nanopowder, Alfa Aesar), periodic acid (PA, HIO$_4$·2H$_2$O, ≥99.0%, Sigma-Aldrich), iodic acid (HIO$_3$, ≥99.5%, Sigma-Aldrich), sodium periodate (NaIO$_4$, ≥99.8%, Sigma-Aldrich), sodium iodate (NaIO$_3$, 99%, Sigma-Aldrich), sodium iodide (NaI, 99.0%, Sigma-Aldrich), chloroplatinic acid (H$_2$PtCl$_6$·xH$_2$O, ≥99.9%, Sigma-Aldrich), methanol (MeOH, CH$_3$OH, 99.9%, Samchun Chemicals), isopropyl alcohol (IPA, (CH$_3$)$_2$CHOH, 99.5%, Sigma-Aldrich), acetone (AT, CH$_3$COCH$_3$, 99.98%, Burdick Jackson), dichloromethane (DCM, CH$_2$Cl$_2$, ≥99.8%, Sigma-Aldrich), n-pentane (C5, CH$_3$(CH$_2$)$_3$CH$_3$, ≥99.0%, Sigma-Aldrich), n-chloropropane (ClC3, CH$_3$CH$_2$CH$_2$Cl, 99%, Alfa Aesar), 5,5-dimethyl-1-pyrroline-N-oxide (DMPO, ≥98.0%, Sigma-Aldrich). Toluene (Tol, 300 ppmv, N$_2$ balance), acetaldehyde (AA, 1000 ppmv, N$_2$ balance) were purchased from the Deokyang Company. All chemicals were of reagent grade and used as received without further purification. Ultrapure deionized water (18 MΩ·cm) prepared using a Millipore system was used.

Photocatalytic Complex

Example 1: PA/WO$_3$

Periodic acid (PA) was dissolved in water to prepare a PA solution, and the concentration of the PA solution was 0.11 mol/L.

0.25 g of tungsten trioxide (WO$_3$) was dispersed in 10 mL of the PA solution under sonication to prepare a mixture, and the pH of the mixture was about 3. The mixture was stirred at room temperature for 12 hours, and the obtained suspension was completely dried in an oven at 80° C. to prepare a PA/WO$_3$ photocatalytic composite.

Example 2: NaIO$_4$/WO$_3$

A NaIO$_4$/WO$_3$ photocatalytic complex was prepared in the same manner as in Example 1, except that sodium periodate (NaIO$_4$) was used instead of periodic acid (PA) in Example 1.

Example 3: HIO$_3$/WO$_3$

A HIO$_3$/WO$_3$ photocatalytic complex was prepared in the same manner as in Example 1, except that iodic acid (HIO$_3$) was used instead of periodic acid (PA) in Example 1.

Example 4: NaIO$_3$/WO$_3$

A NaIO$_3$/WO$_3$ photocatalytic complex was prepared in the same manner as in Example 1, except that sodium iodate (NaIO$_3$) was used instead of periodic acid (PA) in Example 1.

Example 5: NaI/WO$_3$

A NaI/WO$_3$ photocatalytic complex was prepared in the same manner as in Example 1, except that sodium iodide (NaI) was used instead of periodic acid (PA) in Example 1.

Example 6: PA/N—TiO$_2$

A PA/N—TiO$_2$ photocatalytic composite was prepared in the same manner as in Example 1, except that N-doped titanium dioxide (N—TiO$_2$) was used instead of tungsten trioxide (WO$_3$) in Example 1.

The N-doped titanium dioxide (N—TiO$_2$) was prepared by treating titanium dioxide (P25, Evonik) at 500° C. under NH$_3$ gas flow (150 mL/min) for 5 hours.

Example 7: PA/BiVO$_4$

A PA/BiVO$_4$ photocatalytic composite was prepared in the same manner as in Example 1, except that bismuth vanadate (BiVO$_4$) was used instead of tungsten trioxide (WO$_3$) in Example 1.

Example 8: PA/TiO$_2$

A PA/TiO$_2$ photocatalytic composite was prepared in the same manner as in Example 1, except that titanium dioxide (P25) was used instead of tungsten trioxide (WO$_3$) in Example 1.

Comparative Example 1: WO$_3$

Tungsten trioxide (WO$_3$, Sigma-Aldrich) was used as a photocatalyst.

Comparative Example 2: N—TiO$_2$

N-doped titanium dioxide (N—TiO$_2$) was used as a photocatalyst. The N-doped titanium dioxide (N—TiO$_2$) was prepared by treating titanium dioxide (P25, Evonik) at 500° C. under NH$_3$ gas flow (150 mL/min) for 5 hours.

Comparative Example 3: BiVO$_4$

Bismuth vanadate (BiVO$_4$, Alfa Aesar) was used as a photocatalyst.

Comparative Example 4: PA

Periodic acid (PA) was used as a photocatalyst.

Comparative Example 5: Pt/WO$_3$

A Pt/WO$_3$ photocatalytic composite was prepared in the same manner as in Example 1, except that 1 wt % platinum (Pt) was used instead of periodic acid (PA) in Example 1. Chloroplatinic acid (H$_2$PtCl$_6$·xH$_2$O, ≥99.9%, Sigma-Aldrich) as a Pt precursor and MeOH (1 mol/L) as an electron donor were added into an aqueous suspension of tungsten trioxide WO$_3$. The suspension was photoirradiated with a 200-W mercury lamp for 30 minutes. The resulting Pt/WO$_3$ powder was collected by filtration and washed with deionized water.

Comparative Example 6: TiO$_2$

Titanium dioxide (P25, Evonik) was used as a photocatalyst.

TEST EXAMPLE

Test Example 1: Evaluation of Water Absorption Capacity

Figure 2A:
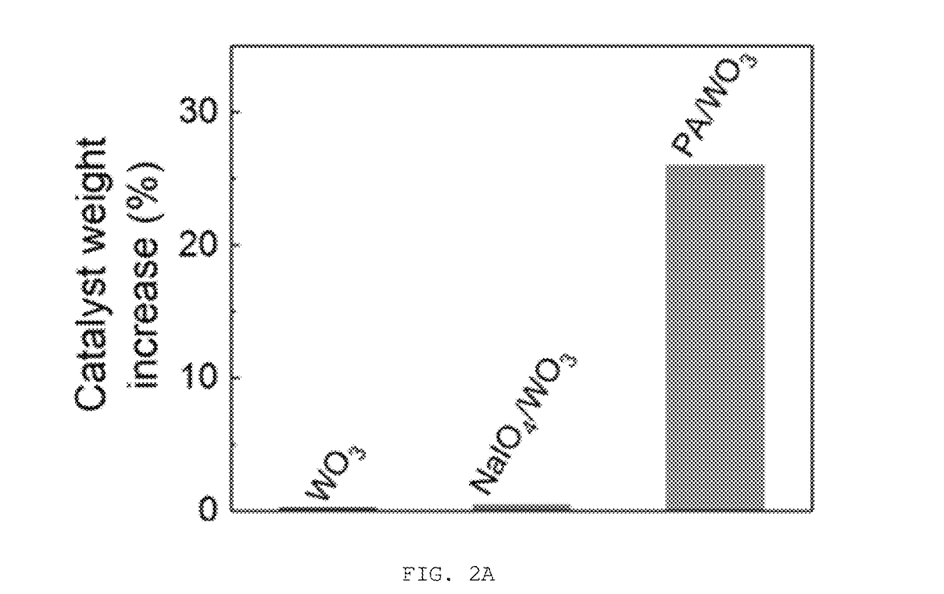
FIG. 2A is a graph illustrating the change in catalyst weight of Comparative Example 1 ($WO_3$), Example 2 ($NaIO_4/WO_3$), and Example 1 ($PA/WO_3$) after exposing each catalyst to humid air (RH 65%) for 30 minutes.
Figure 2B:
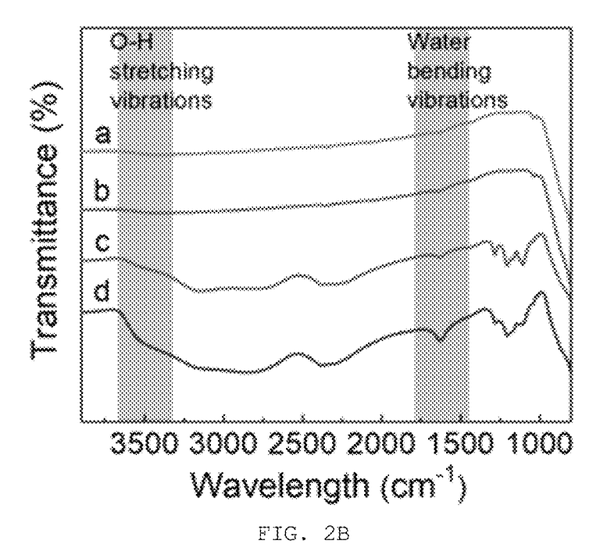
FIG. 2B is a graph illustrating Fourier transform infrared (FT-IR) spectra of Comparative Example 1 ($WO_3$) (a) before and (b) after exposing to humid air for 30 minutes, and those of Example 1 ($PA/WO_3$) (c) before and (d) after exposing to humid air for 30 minutes.

FIG. 2A is a graph illustrating the change in catalyst weight of Comparative Example 1 (WO$_3$), Example 2 (NaIO$_4$/WO$_3$), and Example 1 (PA/WO$_3$) after exposing each catalyst to humid air (RH 65%) for 30 minutes, and FIG. 2B is a graph illustrating Fourier transform infrared (FT-IR) spectra of Comparative Example 1 (WO$_3$) (a) before and (b) after exposing to humid air for 30 minutes, and those of Example 1 (PA/WO$_3$) (c) before and (d) after exposing to humid air for 30 minutes. To evaluate the water absorption capacity, fresh air with a relative humidity of 65% was flowed over the surface of each catalyst for 30 minutes. Fourier transform infrared (FT-IR) spectra were obtained using a Thermo Scientific Nicolet iS50 FT-IR/ATR.

According to FIG. 2A, the weight of Comparative Example 1 (WO$_3$) and Example 2 (NaIO$_4$/WO$_3$) was not changed while that of Example 1 (PA/WO$_3$) increased by about 26%. The presence of PA induces the formation of an in-situ water layer between the surface of photocatalyst and air phase, and the water layer on the surface of the photocatalyst dissolves and concentrates hydrophilic VOCs therein, which promotes catalytic activity.

According to FIG. 2B, the FT-IR spectra show that the signals of surface OH (3600 to 3200 cm$^{-1}$) and adsorbed water (~1600 cm$^{-1}$) for Example 1 (PA/WO$_3$) were markedly enhanced after exposure to humid air. However, these signals for Comparative Example 1 (WO$_3$) remained almost unchanged after exposure to humid air.

Therefore, the PA/WO$_3$ photocatalyst composite according to the present disclosure was found to have excellent water absorption ability.

Test Example 2: Evaluation of Light Absorption Capacity

Figure 3A:
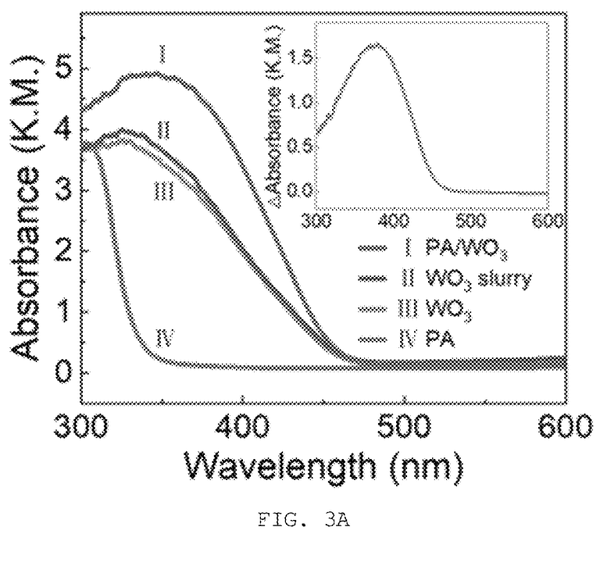
FIG. 3A is a graph illustrating diffuse reflectance UV-visible absorption spectra (DRS) (inset is the difference DRS spectrum which is obtained from the spectrum I minus the spectrum III)
Figure 3B:
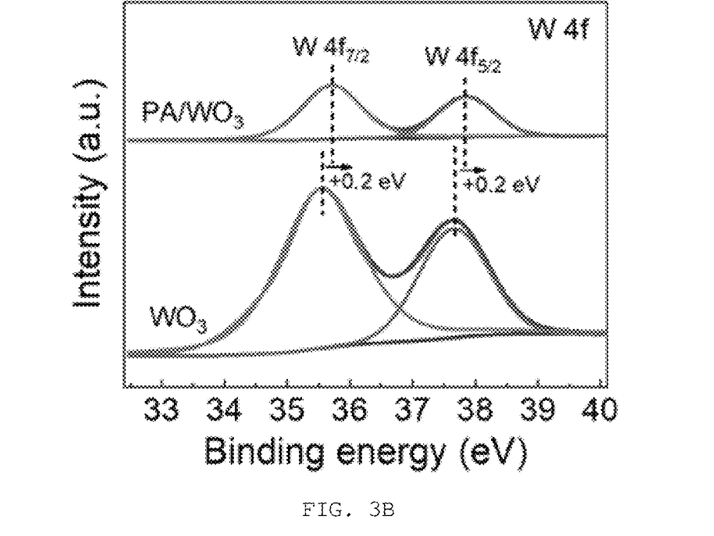
FIG. 3B is a graph illustrating W 4f X-ray photoelectron spectroscopy (XPS) spectra of Example 1 ($PA/WO_3$) and Comparative Example 1 ($WO_3$)
Figure 3C:
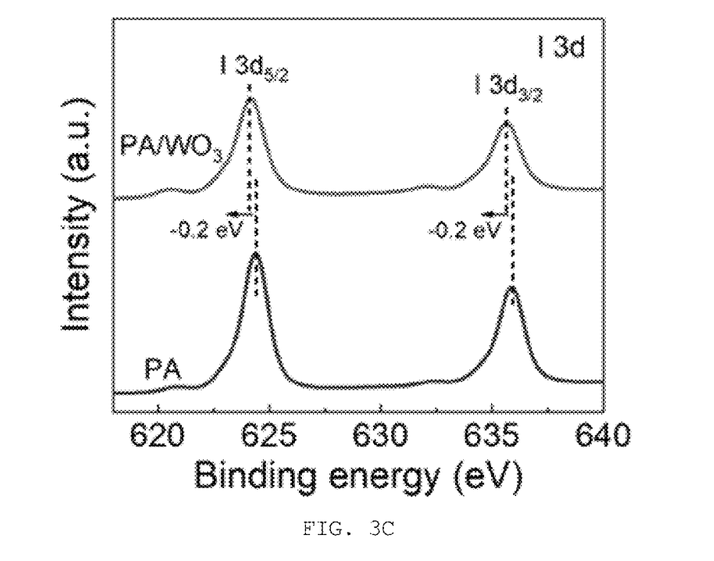
FIG. 3C is a graph illustrating I 3d X-ray photoelectron spectroscopy (XPS) spectra of Example 1 ($PA/WO_3$) and Comparative Example 4 (PA)

FIG. 3A is a graph illustrating diffuse reflectance UV-visible absorption spectra (DRS) (inset is the difference DRS spectrum which is obtained from the spectrum I minus the spectrum III). FIG. 3B is a graph illustrating W 4f X-ray photoelectron spectroscopy (XPS) spectra of Example 1 (PA/WO$_3$) and Comparative Example 1 (WO$_3$), and FIG. 3C is a graph illustrating I 3d X-ray photoelectron spectroscopy (XPS) spectra of Example 1 (PA/WO$_3$) and Comparative Example 4 (PA). Diffuse reflectance UV-visible absorption spectroscopy (DRS) was conducted using Shimadzu UV-2401PC, and X-ray photoelectron spectroscopy (XPS) spectra were analyzed using a Thermo Scientific K-Alpha XPS.

According to FIG. 3A, the light absorption capacity of WO$_3$ was clearly enhanced in the range of 300 to 450 nm after binding with PA. This PA-enhanced absorption capacity is more clearly seen in the difference DRS spectra illustrated in the inset of FIG. 3A. Since the absorption spectrum of WO$_3$ slurry (26 wt % water content) was little different from that of dry WO$_3$ powder, the enhanced light absorption of PA/WO$_3$ was not be attributed to the in-situ water layer. Therefore, the enhanced absorption in the 300 to 450 nm region where PA itself is optically transparent was attributed to the surface interaction between PA and WO$_3$.

Furthermore, according to FIGS. 3B and 3C, two binding energy (BE) peaks in the W 4f XPS spectra of Example 1 (PA/WO$_3$) were shifted to higher binding energy in comparison to those of WO$_3$, whereas those in the I 3d XPS spectra of Example 1 (PA/WO$_3$) exhibited a negative shift. This indicates that the BE difference between PA/WO$_3$ and PA is ~0.2 eV. It can be inferred that the oxygen atom in PA molecule could be directly complexed with a W cation on the surface of WO$_3$ in the form of "W—O—I—(OH)$_n$". The charge transfer in the "W—O—I—(OH)$_n$" complex promotes the electron transfer ability and light absorption ability of WO$_3$.

Photocatalytic Degradation (PCD) Experiment

The PCD of VOCs was conducted under visible light irradiation from a mercury lamp, which was filtered through a 420-nm cutoff (λ>420 nm) filter. The filtered light intensity on the photocatalyst was measured to be 2.2 mW/cm² by a power meter (Newport 1918-R). A closed-circulation glass reactor (300 mL) with a quartz window (a radius of 3 cm) was used, and a magnetic bar was placed at the bottom of the glass reactor to stir air. The reactor was connected to a gas chromatograph (GC-Agilent 6890 Plus) equipped with a methane converter, a Porapak R column, an automatic sampling valve using an air actuator, and a flame ionization detector. The relative humidity (RH) was adjusted to ~65% by bubbling air through a stainless-steel bottle containing deionized water. A heating device was used to maintain the temperature of the reactor at ~30° C.

A catalyst slurry was prepared by dispersing photocatalyst powder (50 mg) according to Example or Comparative Example in water, and then the catalyst slurry was coated on a quartz glass sink which a 2 cm×2 cm groove. The catalyst slurry was completely dried and placed in the reactor for PCD tests. Before each PCD test, the reactor was purged with high-purity air and irradiated under the mercury lamp to degrade any organic impurities remaining on the photocatalyst surface. The cleaning irradiation continued until the photogeneration of carbon dioxide ($CO_2$) was not detected.

Target VOCs tested herein include acetaldehyde (AA), isopropanol (IPA), acetone (AT), methanol (MeOH), dichloromethane (DCM), n-pentane (C5), n-chloropropane (ClC3), and toluene (Tol). AA or Tol was introduced into the reactor through diluting the standard gas (1000 ppmv acetaldehyde, 300 ppmv toluene in $N_2$). For other VOCs (IPA, AT, MeOH, DCM, C5, or ClC3), a calculated amount of each liquid sample was injected into the reactor and subsequently vaporized into the gas phase. The initial concentration of VOCs was adjusted to 120 ppmv. After 20 minutes equilibration for complete dispersion and pre-adsorption of VOCs on the photocatalyst surface, the mercury lamp was turned on to initiate the PCD process. The removal of each VOC and the accompanying $CO_2$ production were monitored in real time by using a GC.

Test Example 3: Analysis of Mineralization Efficiency of Catalyst

Figure 4A:
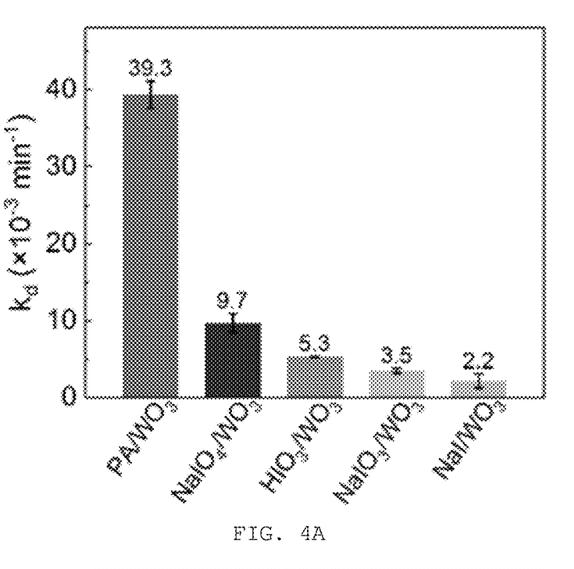
FIGS. 4A and 4B are graphs illustrating the photocatalytic degradation (PCD) rate constants ($k_d$) and mineralization efficiencies of catalysts according to Examples 1 to 5.
Figure 4B:
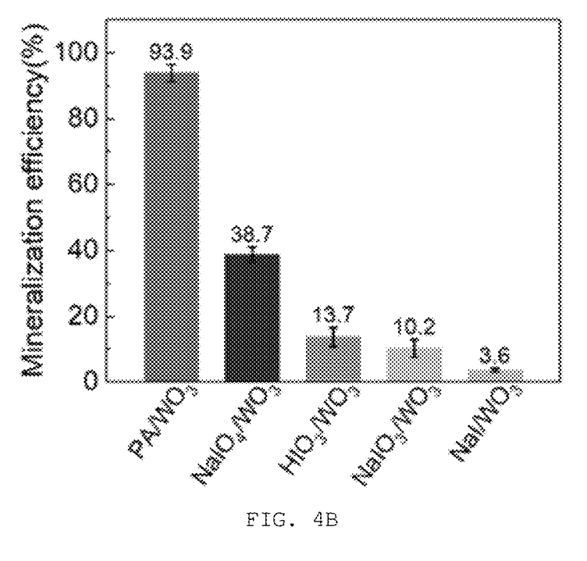
Figure 4C:
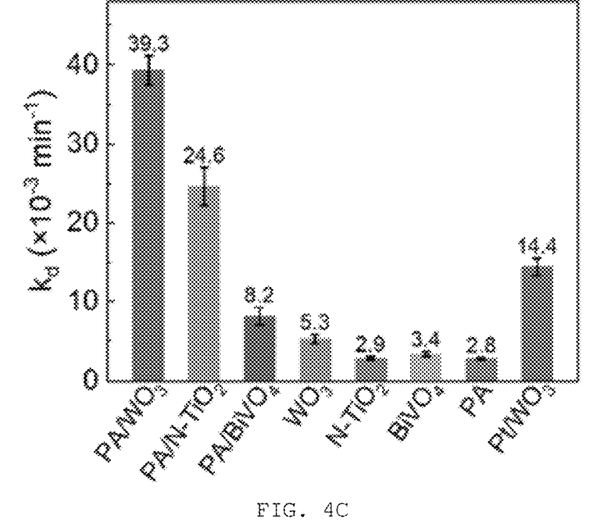
FIGS. 4C and 4D are graphs illustrating the photocatalytic degradation (PCD) rate constants ($k_d$) and mineralization efficiencies of catalysts according to Examples 1, 6, and 7 and Comparative Examples 1 to 5.
Figure 4D:
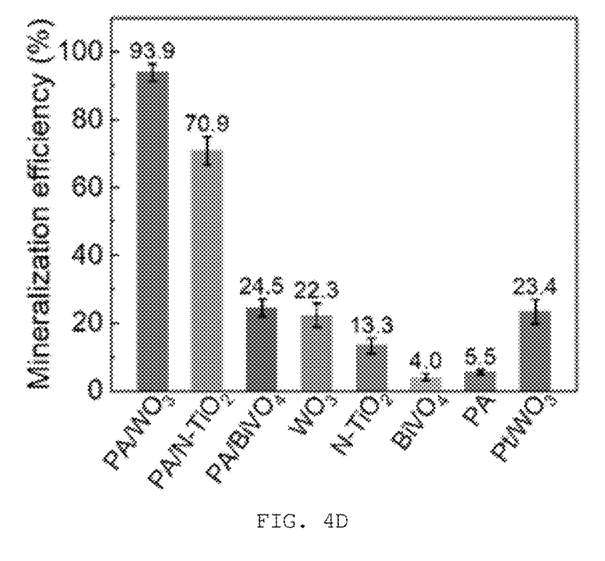

FIGS. 4A and 4B are graphs illustrating the photocatalytic degradation (PCD) rate constants ($k_d$) and mineralization efficiencies of catalysts according to Examples 1 to 5, and FIGS. 4C and 4D are graphs illustrating the photocatalytic degradation (PCD) rate constants ($k_d$) and mineralization efficiencies of catalysts according to Examples 1, 6, and 7 and Comparative Examples 1 to 5. Acetaldehyde with a concentration of 120 ppmv was used as a target compound for the analysis of the mineralization efficiency of the catalysts.

According to FIGS. 4A and 4B, PA exhibited an excellent PCD promoting effect for $WO_3$ over other iodine-containing compounds ($NaIO_4$, $HIO_3$, $NaIO_3$, and NaI).

Furthermore, according to FIGS. 4C and 4D, both the degradation of acetaldehyde and the accompanying production of $CO_2$ of Example 1 (PA/$WO_3$) were significantly higher than those of Comparative Example 5 (Pt/$WO_3$). This confirms that the role of water vapor formed on the surface of PA/$WO_3$ is critical in controlling the overall PCD process. Additionally, the PCD activities of N—$TiO_2$ and $BiVO_4$ treated with PA were significantly improved.

Test Example 4: Analysis of Photocatalytic Degradation (PCD) Activity under UV Light Irradiation FIG. 5 is a graph illustrating the photocatalytic degradation (PCD) activities of Example 8 (PA/$TiO_2$) and Comparative Example 6 ($TiO_2$) under UV light irradiation.

Figure 5:
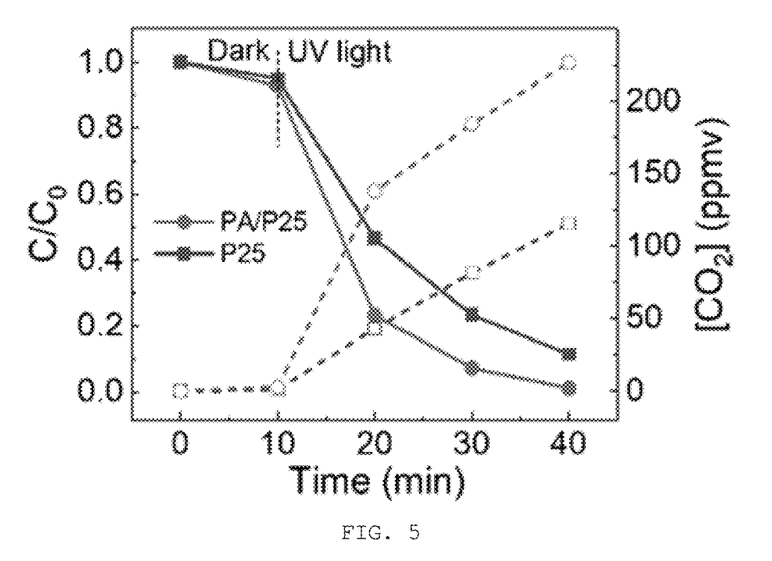
FIG. 5 is a graph illustrating the photocatalytic degradation (PCD) activities of Example 8 ($PA/TiO_2$) and Comparative Example 6 ($TiO_2$) under UV light irradiation.

According to FIG. 5, $TiO_2$, which is a typical UV photocatalyst, also increased in activity under UV light irradiation.

Figure 6A:
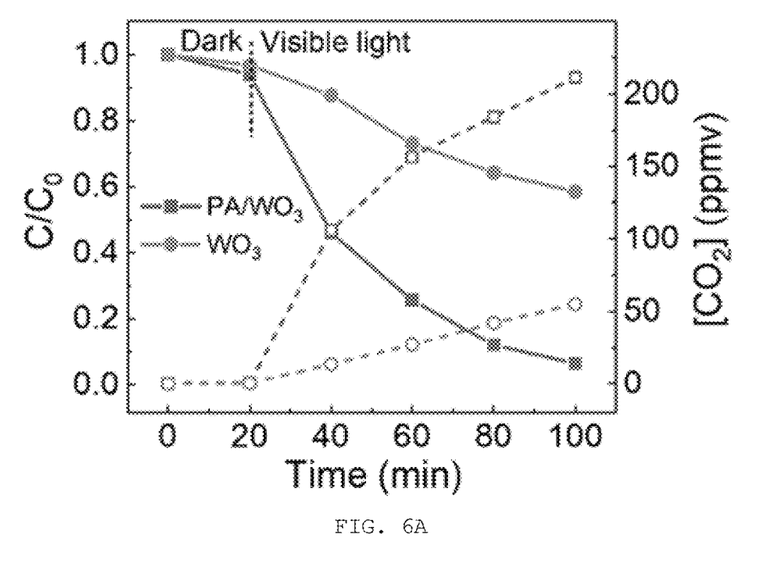
FIGS. 6A to 6C are graphs illustrating the photocatalytic degradation (PCD) activities of Example 1 ($PA/WO_3$) and Comparative Example 1 ($WO_3$) under different irradiation conditions.
Figure 6B:
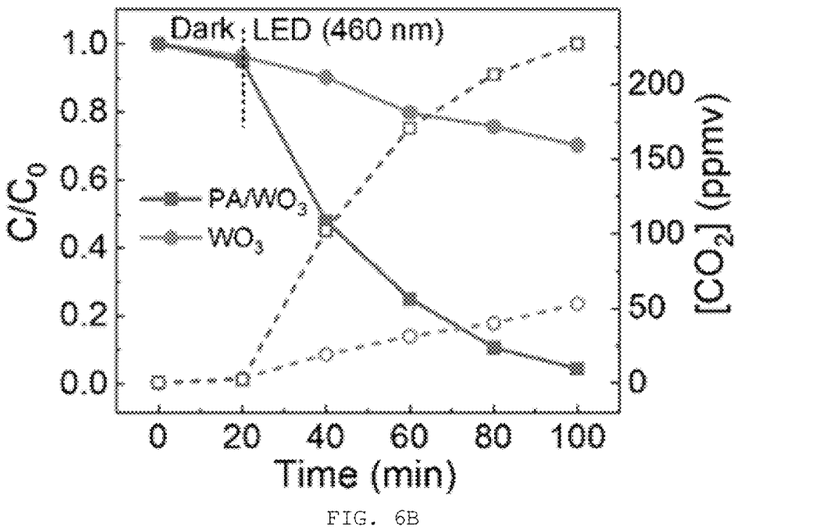
Figure 6C:
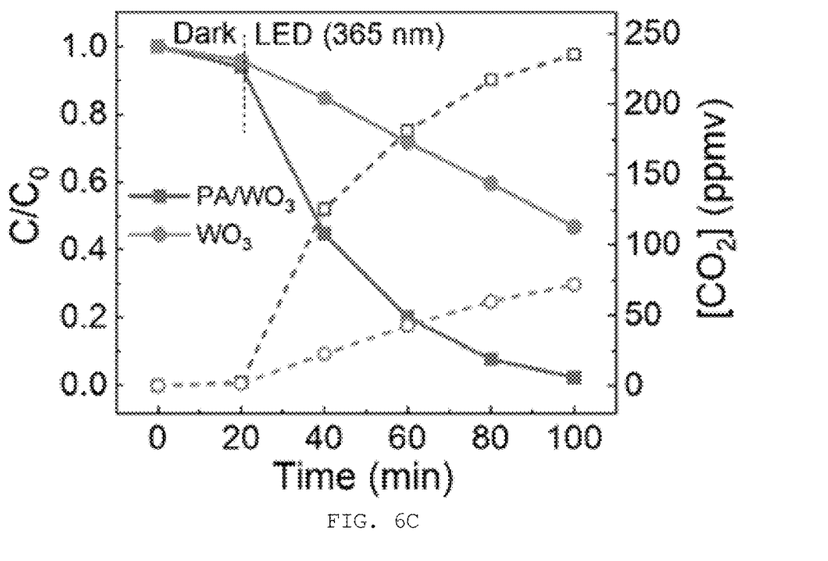

Test Example 5: Analysis of Photocatalytic Degradation (PCD) Activity Under Different Irradiation Conditions FIGS. 6A to 6C are graphs illustrating the photocatalytic degradation (PCD) activities of Example 1 (PA/$WO_3$) and Comparative Example 1 ($WO_3$) under different irradiation conditions. FIG. 6A illustrates the photocatalytic degradation (PCD) activity under irradiation of a halogen lamp with 420-nm cutoff filter ($\lambda$>420 nm, 7.5 mW/cm²), FIG. 6B illuminates the photocatalytic degradation (PCD) activity under irradiation of a blue LED ($\lambda$=460 nm, 2.0 mW/cm²), and FIG. 6C illustrates the photocatalytic degradation (PCD) activity under irradiation of a UV LED ($\lambda$=365 nm, 2.0 mW/cm²).

According to FIGS. 6A to 6C, Example 1 (PA/$WO_3$) exhibited excellent PCD activities under various different irradiation conditions of the halogen lamp ($\lambda$>420 nm), blue LED ($\lambda$=460 nm) and UV LED ($\lambda$=365 nm).

Test Example 6: Analysis of Photocatalytic Degradation (PCD) Activity Depending on Acetaldehyde Concentration FIGS. 7A and 7B are graphs illustrating the photocatalytic degradation (PCD) activity and apparent quantum efficiency (AQE) of Example 1 (PA/$WO_3$) for PCD of acetaldehyde (AA) of different concentrations under blue LED ($\lambda$=460 nm) irradiation.

Figure 7A:
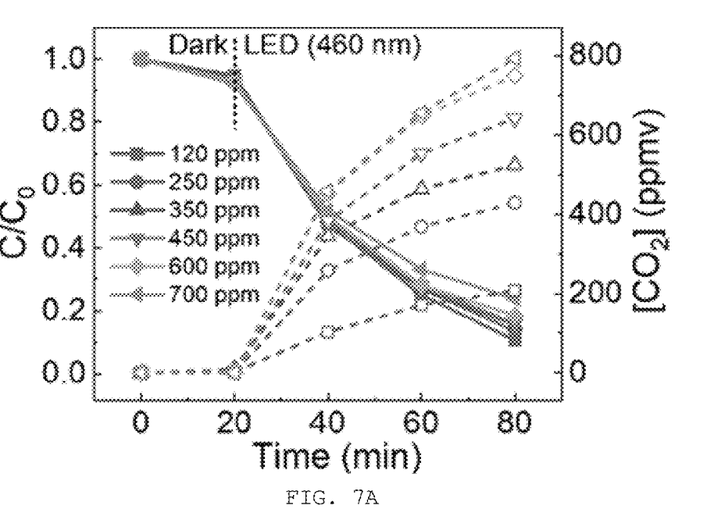
FIGS. 7A and 7B are graphs illustrating the photocatalytic degradation (PCD) activity and apparent quantum efficiency (AQE) of Example 1 (PA/WO$_3$) for PCD of acetaldehyde (AA) of different concentrations under blue LED ($\lambda$=460 nm) irradiation.
Figure 7B:
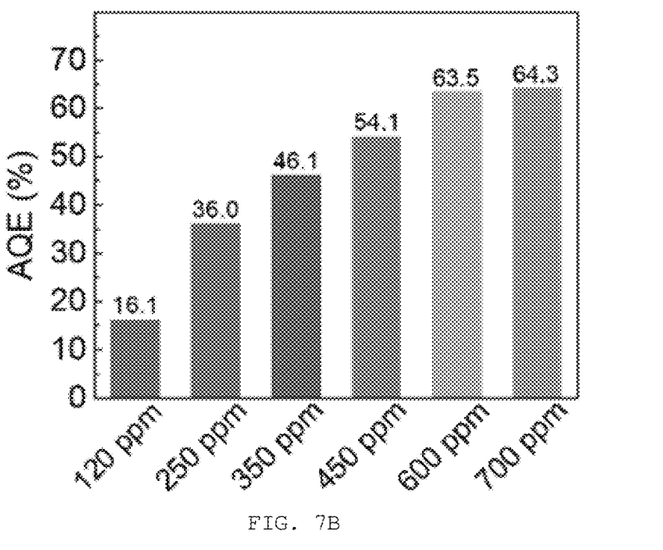

According to FIGS. 7A and 7B, Example 1 (PA/$WO_3$) exhibited excellent ability for degrading acetaldehyde of different concentrations (120 to 700 ppmv) under blue LED irradiation. This implies the unique AA-accumulating behavior of PA/$WO_3$. In particular, an outstanding AQE as high as 64.3% was achieved when the initial AA concentration was 700 ppmv.

Test Example 7: Analysis Photocatalytic Degradation (PCD) Activity Depending on Oxygen Concentration FIG. 8 is a graph illustrating the photocatalytic degradation (PCD) activity of acetaldehyde (AA) over Example 1 (PA/$WO_3$) under different oxygen ($O_2$) concentration conditions.

Figure 8:
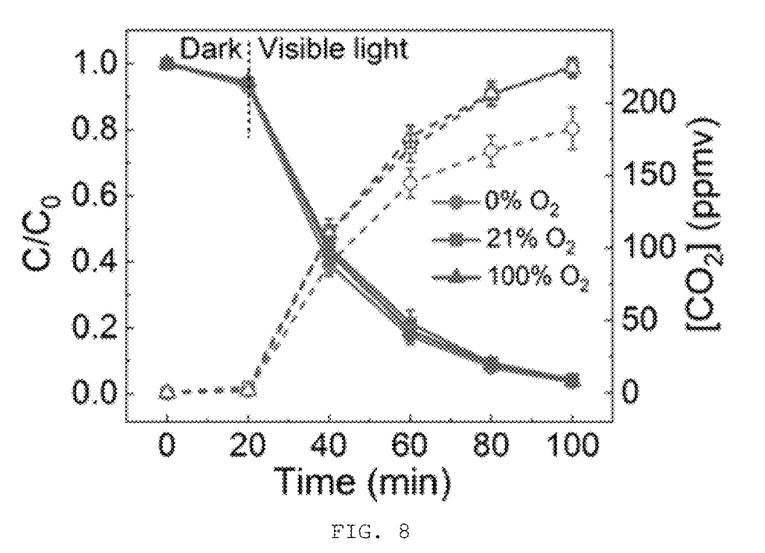
FIG. 8 is a graph illustrating the photocatalytic degradation (PCD) activity of acetaldehyde (AA) over Example 1 (PA/WO$_3$) under different oxygen (O$_2$) concentration conditions.

According to FIG. 8, the PCD activity of AA over Example 1 (PA/$WO_3$) could be maintained even in the absence of $O_2$.

Test Example 8: Analysis of Activity Regeneration of Catalyst

Figure 9:
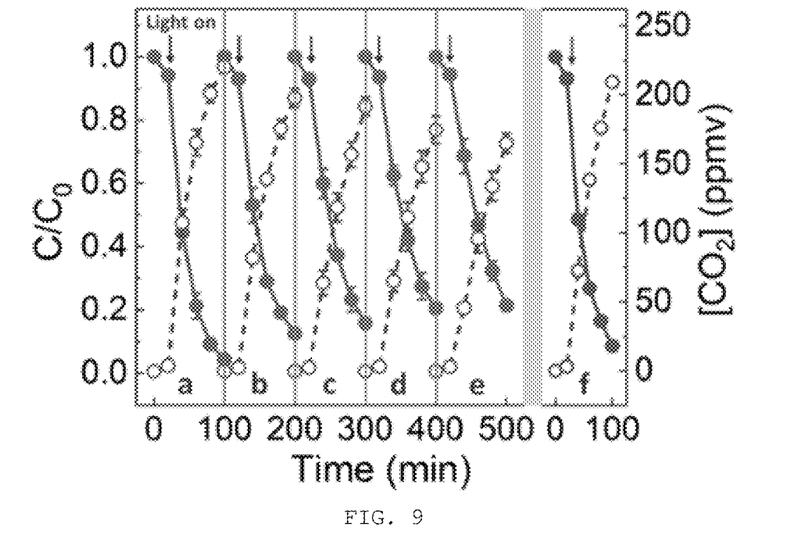
FIG. 9 is a graph illustrating repeated PCD cycles of acetaldehyde (AA) degradation and the accompanying production of carbon dioxide (CO$_2$) over Example 1 (PA/WO$_3$)

FIG. 9 is a graph illustrating repeated PCD cycles of acetaldehyde (AA) degradation and the accompanying production of carbon dioxide ($CO_2$) over Example 1 (PA/$WO_3$). In FIG. 9, a to e represent first to fifth cycles, respectively, and f represents the activity of Example 1 (PA/$WO_3$) regenerated after 5 repeated PCD experiments.

According to FIG. 9, the activity of AA over Example 1 (PA/$WO_3$) regenerated after the fifth cycle was the same as that in the first cycle. This indicates that Example 1 (PA/$WO_3$) was fully regenerated.

Figure 10A:
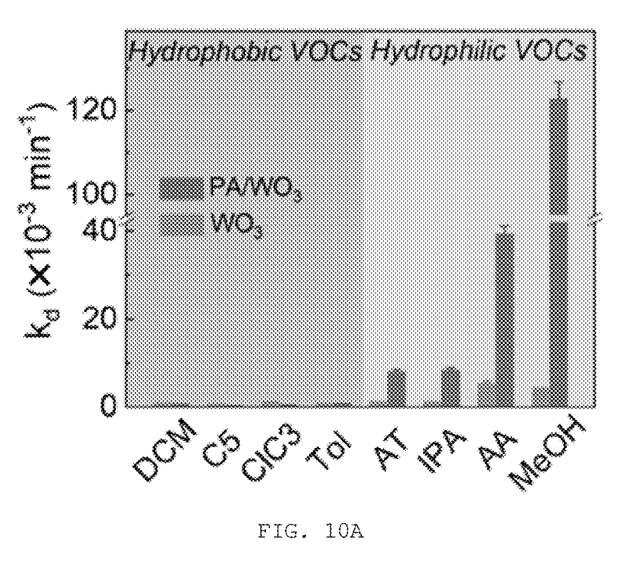
FIGS. 10A and 10B are graphs illustrating the photocatalytic degradation (PCD) rate constants ($k_d$) and mineralization efficiencies of Example 1 (PA/WO$_3$) and Comparative Example 1 (WO$_3$) depending on the type of volatile organic compounds.
Figure 10B:
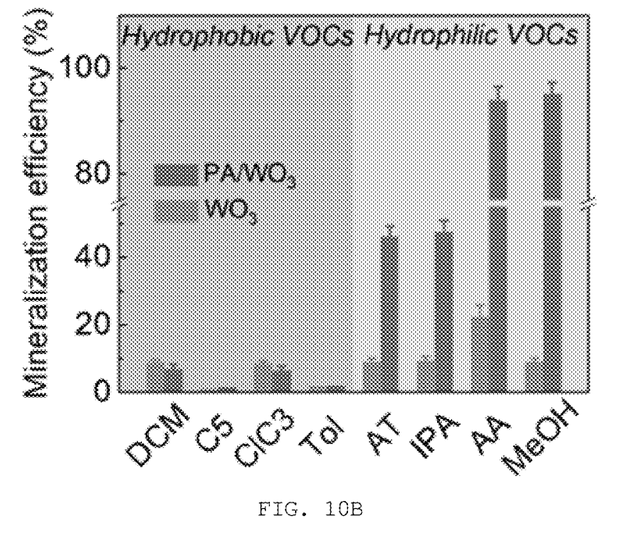

Test Example 9: Analysis of Mineralization Efficiency of Catalyst Depending on Type of Volatile Organic Compounds FIGS. 10A and 10B are graphs illustrating the photocatalytic degradation (PCD) rate constants ($k_d$) and mineralization efficiencies of Example 1 (PA/WO$_3$) and Comparative Example 1 (WO$_3$) depending on the type of volatile organic compounds (DCM: dichloromethane; C5: n-pentane; ClC3: n-chloropropane; Tol: toluene; AT: acetone; IPA: isopropanol; AA: acetaldehyde; MeOH: methanol).

According to FIGS. 10A and 10B, hydrophilic VOCs such as methanol (MeOH), isopropanol (IPA), acetone (AT), and acetaldehyde (AA) could be readily dissolved in the water layer and fully degraded into $CO_2$, whereas hydrophobic VOCs such as dichloromethane (DCM), n-pentane (C5), n-chloropropane (ClC3), and toluene (Tol) remained intact due to the "water barrier effect" of the water layer. This clearly shows that Example 1 (PA/WO$_3$) has an outstanding selectivity for the degradation of hydrophilic VOCs.

The aforementioned descriptions are only for illustrative purposes, and it will be apparent that those of skill in the art can make various modifications thereto without changing the technical spirit and essential features of the present disclosure. Thus, it should be understood that the embodiments described above are merely for illustrative purposes and not for limitation purposes in all aspects. For example, each component described as a single type can be implemented in a distributed type, and components described as distributed can be implemented in a combined form. The scope of the present disclosure is defined by the accompanying claims rather than the description which is presented above, and all changes or modifications derived from the meaning, scope, and equivalent concept of the claims should be interpreted to be included in the scope of the present disclosure.

What is claimed is:

1. A photocatalytic complex consisting of:
   a photocatalyst;
   an iodine compound layer formed on a surface of the photocatalyst to cover the same and containing an iodine compound; and
   a water layer on a surface of the photocatalytic complex covering the same,
   wherein the iodine compound comprises at least one selected from the group consisting of periodic acid (HIO$_4$) and periodic acid hydrate (HIO$_4$·2H$_2$O).

2. The photocatalytic complex of claim 1, wherein the water layer is formed by self-wetting of the iodine compound.

3. The photocatalytic complex of claim 1, wherein the photocatalyst comprises at least one selected from the group consisting of tungsten trioxide (WO$_3$), bismuth vanadate (BiVO$_4$), titanium dioxide (TiO$_2$), and nitrogen (N)-doped titanium dioxide (N—TiO$_2$).

4. The photocatalytic complex of claim 3, wherein the photocatalyst comprises tungsten trioxide (WO$_3$).

5. The photocatalytic complex of claim 1, wherein a cation of the photocatalyst binds with an oxygen atom (O) of the iodine compound.

6. The photocatalytic complex of claim 1, wherein the photocatalytic complex degrades a volatile organic compound.

7. The photocatalytic complex of claim 6, wherein the volatile organic compound comprises at least one selected from the group consisting of formaldehyde (FA), acetaldehyde (AA), methanol (MeOH), isopropanol (IPA), acetone (AT), dichloromethane (DCM), n-pentane (C5), n-chloropropane (ClC3), and toluene (Tol).

8. The photocatalytic complex of claim 6, wherein the photocatalytic complex performs catalytic reactions among gas, liquid, solid phases, wherein
   the gas phase includes the volatile organic compound, the liquid phase includes the water, and the solid phase includes the photocatalyst and the iodine compound layer.

9. A photocatalytic system comprising:
   a substrate; and
   a photocatalytic complex layer formed on the substrate and including a plurality of photocatalytic complexes,
   wherein each of the photocatalytic complexes consists of:
   a photocatalyst;
   an iodine compound layer formed on a surface of the photocatalyst to cover the same and containing an iodine compound; and
   a water layer on a surface of the photocatalytic complex covering the same,
   wherein the iodine compound comprises at least one selected from the group consisting of periodic acid (HIO$_4$) and periodic acid hydrate (HIO$_4$·2H$_2$O).

* * * * *